United States Patent [19]

Gutman

[11] 3,890,410

[45] June 17, 1975

[54] SUBSTITUTED TRITHIOPHOSPHONATES

[75] Inventor: Arnold D. Gutman, Berkeley, Calif.

[73] Assignee: Stauffer Chemical Company, Westport, Conn.

[22] Filed: Mar. 25, 1974

[21] Appl. No.: 454,191

Related U.S. Application Data

[60] Division of Ser. No. 284,005, Aug. 28, 1972, abandoned, which is a continuation-in-part of Ser. No. 184,244, Sept. 27, 1971, abandoned.

[52] U.S. Cl. .............. 260/956; 260/940; 260/941; 260/943; 260/948; 424/210; 424/211; 424/212; 424/216
[51] Int. Cl. ......................... C07f 9/40; A01n 9/36
[58] Field of Search ................................. 260/956

[56] References Cited
UNITED STATES PATENTS
3,065,125  11/1962  Newallis et al. ................ 260/956 X Primary Examiner—Anton H. Sutto
Attorney, Agent, or Firm—Harry A. Pacini; Daniel C. Block; Edwin H. Baker

[57] ABSTRACT

Substituted trithiophosphonates having the formula

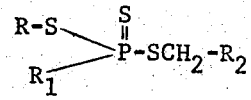

wherein R is lower alkyl, carbethoxyalkyl, phenyl, $R_1$ is lower alkyl, and $R_2$ is lower alkylthio, alkynyl, cyano and N-lower alkyl carbamyl. The compounds of this invention are useful as insecticides.

7 Claims, No Drawings

SUBSTITUTED TRITHIOPHOSPHONATES

This is a division of application Ser. No. 284,005, filed Aug. 28, 1972, now abandoned, which is a continuation-in-part application of U.S. Ser. No. 184,224, filed Sept. 27, 1971, now abandoned.

This invention relates to certain novel substituted trithiophosphonates which are useful as insecticides. The compounds of the present invention are new compositions of matter and correspond to the general formula

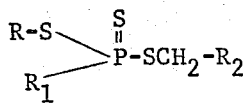

in which R is selected from the group consisting of lower alkyl, carbethoxyalkyl, and phenyl, $R_1$ is lower alkyl, and $R_2$ is selected from the group consisting of lower alkylthio, alkynyl, cyano and N-lower alkylcarbamyl.

In the above description, the following preferred embodiments are intended for the various substituent groups: Lower alkyl preferably includes, unless otherwise provided for, those members which contain from 1 to 6 carbon atoms, inclusive, in both straight chain and branched chain configurations, for example, methyl, ethyl, n-propyl, isopropyl, n-butyl, isobutyl, tertiarybutyl, 1,1-dimethylbutyl, n-pentyl, isopentyl, n-hexyl, isohexyl, and the like; alkynyl, preferably includes those members containing at least one acetylenic triple bond and containing from 2 to 4 carbon atoms, inclusive, such as ethynyl, 1-propynyl, 2-propynyl (propargyl), 1-butynyl, 2-butynyl, and the like.

The compounds of the present invention are prepared by several different methods, depending upon the nature of the starting materials and the products desired. For example, an appropriate mercaptan is reacted with ethylthionophosphine sulfide in the presence of a solvent with heating to form a reactive phosphonothioic acid. Without separation of the intermediate formed thereby, the reactive phosphonothioic acid is reacted with a reactive halogen-containing compound in the presence of a base, such as triethylamine.

The reactions proceed readily in the liquid phase. The employment of a solvent is also useful, facilitating processing, as well as agitation of the reactants. Solvents such as dioxane, is conveniently employed. The reactions are carried out at temperatures that permit operation in the liquid phase. In each instance, after the reaction is complete, the recovery of the product is carried out by normal work-up procedures, such as crystallization, sublimation or distillation. Often the reactions are of a nature that solvent extraction and removal of the solvent is sufficient to obtain a pure compound.

The compounds of the present invention and their preparation are more particularly illustrated by the following examples. Following the examples is a table of compounds which are prepared according to the procedures described herein.

EXAMPLE I

Preparation of
S-propargyl-S-phenylethylphosphonotrithioate

Eleven grams (11.0 g., 0.1 mole) of thiophenol and 12.4 g. (0.05 mole) of ethylthionophosphine sulfide are combined with 300 ml. of dioxane in a 1-liter beaker. The mixture is stirred and heated to 80°C. until a solution is obtained. The mixture is cooled to 10°C. and 11.9 g. (0.1 mole) of propargyl bromide is added in one portion, followed by 15.1 g. (0.15 mole) of triethylamine added over a period of 15 minutes. After the addition is complete, the mixture is stirred at room temperature for 1 hour. The reaction mass is poured into 300 ml. of benzene and washed in turn with 200 ml. of 5 percent hydrochloric acid, 200 ml. of 5 percent caustic solution, two 200 ml. portions of water. The benzene phase is dried with anhydrous magnesium sulfate and the solvent evaporated. There is obtained a yield of 20 g. (73.5 percent of theory) of the title compound, $n_D^{30} = 1.6290$.

EXAMPLE II

Preparation of
S-isopropylethyl-S-ethylthiomethyltrithiophosphonate

Seven and six-tenths grams (7.6 g., 0.1 mole) of isopropyl mercaptan, 12.4 g. (0.05 mole) of ethylthionophosphine sulfide, 11.1 g. (0.1 mole) of chloromethyl ethyl sulfide, and 15.1 g. (0.15 mole) triethylamine are reacted together in the same manner as Example I. There is obtained a yield of 26 g. (95 percent of theory) of the title compound, $n_D^{30} = 1.5750$.

EXAMPLE III

Preparation of S-isopropyl ethyl-S-cyanomethyl trithiophosphonate

Seven and six-tenths grams (7.6 g., 0.1 mole) of isopropylmercaptan, 12.4 g. (0.05 mole) of ethylthionophosphine sulfide, 7.65 g. (0.1 mole) of chloroacetonitrile, and 15.1 g. (0.15 mole) of triethylamine are reacted together in the same manner as Example I. There is obtained a yield of 12.5 g. (52.3 percent of theory) of the title compound, $n_D^{30} = 1.5575$.

EXAMPLE IV

Preparation of
S-(carboethoxymethyl)-ethyl-S-(ethylthiomethyl)-trithiophosphonate Twelve grams (12.0 g., 0.1 mole) of ethylmercaptoacetate and 12.4 g. (0.05 mole) of ethylthionophosphine sulfide are combined with 300 ml. of dioxane in a 1-liter beaker. The mixture is stirred magnetically and heated to 80°C. until a solution is obtained. The mixture is cooled to 10°C. and 11.0 g. (0.1 mole) of chloromethylethyl sulfide is added in one portion followed by 15.1 g. (0.15 mole) of triethylamine added over a period of 15 minutes. The desired product is isolated in the same manner as Example I. There is obtained a yield of 27.0 g. (85 percent of theory) of the title compound, $n_D^{30} = 1.5364$.

The following is a table of the compounds which are prepared according to the aforementioned procedures. Compound numbers have been assigned to them and are used for identification throughout the balance of the specification.

| COMPOUND NUMBER | R | $R_1$ | $R_2$ | $n_D^{30}$ |
|---|---|---|---|---|
| 1 | t—$C_4H_9$ | $C_2H_5$ | $SC_2H_5$ | 1.5845 |
| 2 | t—$C_4H_9$ | $C_2H_5$ | C ≡ CH | 1.5627 |
| 3 | $C_6H_5$ | $C_2H_5$ | C ≡ CH | 1.6290 |
| 4 | $C_2H_5OC(O)CH_2$ | $C_2H_5$ | C ≡ CH | 1.5020 |
| 5 | $C_2H_5OC(O)CH_2$ | $C_2H_5$ | CN | 1.5364 |
| 6 | $C_2H_5OC(O)CH_2$ | $C_2H_5$ | $SC_2H_5$ | 1.5743 |
| 7 | i—$C_3H_7$ | $C_2H_5$ | C(O)NHCH$_3$ | 1.5743 |
| 8 | i—$C_3H_7$ | $C_2H_5$ | C ≡ CH | 1.5720 |
| 9 | i—$C_3H_7$ | $C_2H_5$ | CN | 1.5575 |
| 10 | i—$C_3H_7$ | $C_2H_5$ | $SC_2H_5$ | 1.5750 |
| 11 | $C_6H_5$ | $C_2H_5$ | CN | 1.6217 |
| 12 | $C_6H_5$ | $C_2H_5$ | $SC_2H_5$ | 1.6238 |
| 13 | $C_2H_5$ | $C_2H_5$ | $SC_2H_5$ | 1.6060 |
| 14 | $C_2H_5$ | $C_2H_5$ | C ≡ CH | 1.5987 |
| 15 | $C_2H_5$ | $C_2H_5$ | CN | 1.5833 |
| 16 | $C_2H_5$ | $C_2H_5$ | $SCH_3$ | 1.6115 |
| 17 | $CH_3$ | $C_2H_5$ | $SC_2H_5$ | 1.6080 |
| 18 | $CH_3$ | $C_2H_5$ | CN | 1.5930 |
| 19 | n—$C_3H_7$ | $C_2H_5$ | $SC_2H_5$ | 1.5715 |
| 20 | $CH_3$ | $C_2H_5$ | C ≡ CH | 1.6035 |
| 21 | n—$C_3H_7$ | $C_2H_5$ | C ≡ CH | 1.5717 |
| 22 | $CH_3$ | $C_2H_5$ | $SCH_3$ | 1.6228 |
| 23 | n—$C_3H_7$ | $C_2H_5$ | CN | 1.5660 |
| 24 | n—$C_3H_7$ | $C_2H_5$ | $SCH_3$ | 1.5920 |
| 25 | i—$C_4H_9$ | $C_2H_5$ | $SC_2H_5$ | 1.5745 |
| 26 | i—$C_4H_9$ | $C_2H_5$ | C ≡ CH | 1.5623 |
| 27 | i—$C_4H_9$ | $C_2H_5$ | CN | 1.5555 |
| 28 | i—$C_4H_9$ | $C_2H_5$ | $SCH_3$ | 1.5830 |

Other examples of compounds falling within the generic formula presented herein, which are preparable by the aforedescribed procedures and which may be formulated into insecticidal compositions and applied as herein illustrated are:

| R | $R_1$ | $R_2$ |
|---|---|---|
| $CH_3$ | $CH_3$ | $SCH_3$ |
| $C_2H_5$ | $CH_3$ | C ≡ CH |
| i—$C_3H_7$ | $CH_3$ | $SC_2H_5$ |
| $CH_3$ | $CH_3$ | C ≡ CH |
| $CH_3$ | $CH_3$ | CN |
| $C_2H_5$ | $CH_3$ | $SCH_3$ |
| $CH_3$ | $CH_3$ | $SC_2H_5$ |
| i—$C_3H_7$ | $CH_3$ | $SCH_3$ |

INSECTICIDAL SCREENING TESTS

The term "insect" is used herein in its broad common usage to include spiders, mites, ticks and like pests which are not in the strict biological sense classified as insects. The term "insect" is used to refer not only to those small invertebrate animals belonging mostly to the class Insecta, comprising six-legged usually winged forms, as beetles, bugs, bees, flies, and so forth, but also to other allied classes of arthropods whose members are wingless and usually have more than six legs, as spiders, mites, ticks, centipedes, and wood lice.

Housefly (*Musca domestica* (L.)), was tested according to the following procedure:

A stock solution containing 100 μg/ml of the toxicant in an appropriate solvent is prepared. Aliquots of this solution are combined with one ml. of an acetone-peanut oil solution in a small dish, 55 mm in diameter, and allowed to dry. The aliquots are varied to achieve desired toxicant concentrations ranging from 100 μg per dish, down to that concentration at which 50 percent mortality is obtained. The dishes are placed in a circular cardboard cage, closed on the bottom with cellophane and covered on top with cloth netting. Twenty-five female house flies are introduced into the cage and the percent mortality is recorded after 48 hours. LD–50 values are expressed in terms of μg per 25 female flies in Table II, under HF.

Lygus bug (*Lygus hesperus* (Knight)), was tested according to the following procedure:

Ten 1-month old nymphs are placed into a circular cardboard cage sealed on one end with cellophane and covered by cloth netting on the other. Aliquots of the toxicant, dissolved in an appropriate solvent, are diluted in water to which has been added 0.0002 percent of a conventional wetting agent, such as polyoxyethylene sorbitan monolaurate ether of alkylated phenols blended with organic sulfonates. Test concentrations range from 0.1 percent to that at which 50 percent mortality is obtained. Each of these aqueous suspensions are sprayed onto the insects, through the cloth netting, by means of a hand spray gun. Percent mortality is recorded after 72 hours. The LD–50 values are recorded as percent of toxicant in the aqueous spray. The values are found in Table II, under LB.

Black Bean Aphid (*Aphis fabae* (Scop.)) was tested according to the following procedure:

Nasturtium (*Tropaeolum* sp.) plants, approximately 2–3 inches tall, are transplanted into sandy loam soil in 3 inch clay pots and infested with 50–75 aphids of mixed ages. Twenty-four hours later they are sprayed, to the point of runoff, with aqueous suspensions of the toxicant. The suspensions are prepared as in previously described tests for Lygus bug, supra. Test concentrations ranged from 0.05 percent to that at which 50 percent mortality is obtained. Mortality is recorded after 48 hours and the LD–50 values are expressed as percent active ingredient in the aqueous suspensions. The results are found in Table II, under BA.

A similar test procedure is used for Two-spotted Mite (*Tetranychus urticae* (Koch)), except that pinto beans (*Phaseolus sp.*) are utilized as the host plant rather than nasturtiums. The results on the post-embryonic form are found in Table II, under 2SM-PE.

Salt Marsh Caterpillar (*Estigmene acrea* (Drury)), Beet Armyworm (*Spodoptera exigua* (Hubner)), and Tobacco Budworm (*Heliothis virescens* (F.)), were tested according to the following procedure except that leaves of Romaine lettuce (*Latuca sativa*) are utilized as the host plant for Beet Armyworm and Tobacco Budworm, instead of dock.

Test solutions are prepared in an identical manner and concentrations are the same as those for the Lygus bug, supra. Sections of bitter dock (*Rumex obtusifolius*) leaves, 1½ inches in length are immersed in the test solutions for 10–15 seconds and placed on a wire screen to dry. The dried leaf is placed on a moistened piece of filter paper in a petri dish and infested with five third-instar larvae. Mortality of the larvae is recorded after 72 hours and the LD–50 values are expressed as percent active ingredient in the aqueous suspensions. The results are found in Table II, under SMC, BAW and TBW, respectively.

German Cockroach (*Blattella germanica* (Linn.)) was tested according to the following procedure:

Ten 1-month old nymphs are placed into a circular cardboard cage sealed on one end with cellophane and covered by cloth netting on the other. Aliquots of the toxicant, dissolved in an appropriate solvent, such as acetone, are diluted in water to which has been added 0.0002 percent of a conventional wetting agent such as polyoxyethylene sorbitan monolaurate ether of alkylated phenols blended with organic sulfonates. Test concentrations range from 0.1 percent to that at which 50 percent mortality is obtained. Each of these aqueous suspensions are sprayed onto the insects, through the cloth netting, by means of a hand spray gun. Percent mortality is recorded after 72 hours and the LD–50 values are expressed as percent of toxicant in the aqueous spray in Table II, under GR.

bean (*Phaseolus sp.*) plants with expanded primary leaves are placed in the solution so that the roots and major protions of the stem are completely immersed. Immediately after, the leaves are infested with 75–100 mites of various ages. Mortality of adults, nymphs and eggs is recorded after one week, and LD–50 values are expressed as parts per million (ppm) of toxicant in the aqueous suspensions. The results are found in Table II under 2SM-SYS.

TABLE II

INSECTICIDAL SCREENING RESULTS
(LD-50 VALUES)

| COMPOUND NUMBER | HF ($\mu$g/25°+) | GR (%) | LB (%) | BA (%) | BAS (ppm) | SMC (%) | BAW (%) | TBW (%) | PE (%) | SYS (ppm) |
|---|---|---|---|---|---|---|---|---|---|---|
| 1 | 25 | >.1 | .008 | .003 | >10 | .1 | .003 | .03 | .001 | 1 |
| 2 | 20 | >.1 | >.05 | >.05 | — | .1 | .05 | .05 | .005 | 10 |
| 3 | 80 | >.1 | >.05 | >.05 | — | .08 | .1 | >.1 | .03 | >10 |
| 4 | 45 | >.1 | >.05 | >.05 | — | >.1 | >.1 | >.1 | >.05 | — |
| 5 | 100 | >.1 | >.05 | .03 | >10 | >.1 | >.1 | >.1 | .05 | — |
| 6 | 50 | >.1 | .05 | .008 | >10 | >.1 | >.1 | >.1 | .05 | 10 |
| 7 | 30 | >.1 | .05 | .001 | 8 | >.1 | >.1 | >.1 | .05 | >10 |
| 8 | 7 | >.1 | .05 | .008 | >10 | .03 | .008 | .05 | .05 | >10 |
| 9 | 100 | .03 | .008 | .005 | 8 | .03 | .005 | .05 | .03 | >10 |
| 10 | 30 | .03 | .003 | .0005 | >10 | .08 | .01 | .03 | .008 | >10 |
| 11 | 100 | — | — | >.05 | — | >.1 | — | — | .05 | >10 |
| 12 | 100 | >.1 | .05 | .005 | >10 | >.1 | .03 | >.1 | .03 | >10 |
| 13 | 50 | .05 | .01 | .003 | — | .03 | .08 | — | — | — |
| 14 | 8 | >.1 | >.05 | .03 | — | .03 | .05 | — | .05 | — |
| 15 | 100 | .03 | .02 | .008 | — | .03 | .08 | — | >.05 | — |
| 16 | 65 | .01 | .007 | .0008 | — | >.05 | — | >.1 | — | — |
| 17 | 65 | .1 | .007 | .0008 | — | >.05 | — | >.1 | — | — |
| 18 | 100 | .1 | .05 | .01 | — | >.05 | — | >.1 | >.05 | — |
| 19 | 20 | .01 | .005 | .0008 | — | — | — | .1 | — | — |
| 20 | 65 | >.1 | >.05 | .03 | — | >.05 | — | .1 | .05 | — |
| 21 | 20 | .05 | .05 | .008 | — | .03 | — | .01 | — | — |
| 22 | 90 | .1 | >.05 | .001 | — | >.05 | — | >.1 | — | — |
| 23 | 100 | .03 | .01 | .001 | — | >.05 | — | >.1 | — | — |
| 24 | 25 | .007 | .003 | .0005 | — | >.05 | — | >.1 | — | — |
| 25 | 20 | .03 | .003 | — | — | .03 | — | >.1 | — | — |
| 26 | 65 | .03 | .01 | .0005 | — | .008 | — | .008 | — | — |
| 27 | 8 | .007 | .007 | .0008 | — | >.05 | — | .03 | — | — |
| 28 | 20 | .007 | .007 | .0005 | — | .05 | — | >.1 | — | — |

NOTE: (—) indicates not tested

SYSTEMIC INSECTICIDE TESTS

The candidate compounds were tested as systemic toxicants against Black bean aphid, according to the following procedure:

Aliquots of the toxicant dissolved in an appropriate solvent are incorporated into 1 pound samples of sandy loam soil and placed into 1 pint cartons, Test concentrations range from 10 ppm of toxicant per pound of soil down to that at which 50 percent mortality is obtained. Nasturtium (*Tropaeolum sp.*) plants, approximately 2–3 inches tall, are transplanted into the treated soil and infested with 50–75 aphids of various ages. Mortality is recorded 72 hours after infestation, and LD–50 values are expressed as parts per million (ppm) of active ingredient per pound of soil. The results are found in Table II under BAS.

The candidate compounds were also tested as systemic toxicants against Two-spotted mite according to the following procedure:

Aliquots of the toxicant dissolved in an appropriate solvent are diluted in water and placed in glass bottles. Concentrations of active ingredient range from 10 ppm to that at which 50 percent mortality is obtained. Pinto As those in the art are well aware, various techniques are available for incorporating the active component or toxicant in suitable pesticidal compositions. Thus, the pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cottonseed and so forth.

Liquid compositions are also useful and normally comprise a dispersion of the toxicant in a liquid media although it may be convenient to dissolve the toxicant directly in a solvent such as kerosene, fuel oil, xylene, alkylated naphthalenes or the like and use such organic solutions directly. However, the more common procedures is to employ dispersions of the toxicant in an aqueous medium and such compositions may be produced by forming a concentrated solution of the toxicant in a suitable organic solvent followed by dispersion in water, usually with the aid of surface active agents. The latter, which may be anionic, cationic or nonionic types, are exemplified by sodium stearate, potassium oleate and other alkaline metal soaps and detergents such as sodium lauryl sulfate, sodium naphthalene sulfonate, sodium alkyl naphthalene sulfonate, methyl cellulose, fatty alcohol ethers, polyglycol fatty acid esters, and other polyoxyethylene surface active agents. The proportion of these agents commonly comprises 1–15 percent by weight of the pesticidal compositions although the proportion is not critical and may be varied to suit any particular situation.

Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A compound having the formula

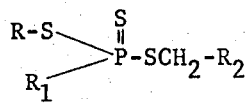

in which R is lower alkyl, $R_1$ is lower alkyl and $R_2$ is alkynyl containing at least one acetylenic triple bond and containing from 2 to 4 carbon atoms, inclusive.

2. A compound according to claim 1 in which R is ethyl, $R_1$ is ethyl and $R_2$ is ethynyl.

3. A compound according to claim 1 in which R is methyl, $R_1$ is ethyl and $R_2$ is ethynyl.

4. A compound according to claim 1 in which R is n-propyl, $R_1$ is ethyl and $R_2$ is ethynyl.

5. A compound according to claim 1 in which R is isobutyl, $R_1$ is ethyl and $R_2$ is ethynyl.

6. A compound according to claim 1 in which R is tertiary-butyl, $R_1$ is ethyl and $R_2$ is ethynyl.

7. A compound according to claim 1 in which R is isopropyl, $R_1$ is ethyl, and $R_2$ is ethynyl.

* * * * *